United States Patent
Hezar et al.

(10) Patent No.: US 10,044,257 B1
(45) Date of Patent: Aug. 7, 2018

(54) METHODS AND APPARATUS TO PROVIDE ADAPTIVE ELECTROMAGNETIC INTERFERENCE CONTROL IN A POWER CONVERTER

(71) Applicant: Texas Instruments Incorporated, Dallas, TX (US)

(72) Inventors: Rahmi Hezar, Allen, TX (US); Jeffrey Morroni, Parker, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/424,426

(22) Filed: Feb. 3, 2017

(51) Int. Cl.
 *H02M 1/44* (2007.01)
 *H02M 1/14* (2006.01)
 *H02M 3/156* (2006.01)
 *H02M 1/00* (2006.01)

(52) U.S. Cl.
 CPC .............. *H02M 1/14* (2013.01); *H02M 1/44* (2013.01); *H02M 3/156* (2013.01); *H02M 2001/0012* (2013.01); *H02M 2001/0038* (2013.01)

(58) Field of Classification Search
 CPC ........................................................ H02M 1/44
 See application file for complete search history.

(56) References Cited

U.S. PATENT DOCUMENTS 6,885,177 B2   4/2005  Fukui
9,203,294 B2 * 12/2015  Nishijima ............... H02M 1/44

2015/0015224 A1   1/2015  Yasusaka
2015/0357914 A1  12/2015  Ozanoglu et al.
2016/0006336 A1   1/2016  Bennett et al.
2016/0011611 A1   1/2016  Yuan et al.
2016/0077142 A1 *  3/2016  Kanayama ............. G01R 31/42
                                                                324/750.3

OTHER PUBLICATIONS

Tao et al., "A Buck Converter With Reduced Output Spurs Using Asynchronous Frequency Hopping," IEEE Transactions on Circuits and Systems—II: Express Briefs, vol. 58, No. 11, Nov. 2011, 5 pages.
Tao et al., "A Low-Noise PFM-Controlled Buck Converter for Low-Power Applications," IEEE Transactions on Circuits and Systems—I: Regular Papers, vol. 59, No. 12, Dec. 2012, 10 pages.
Tao et al., "A GSM Power Amplifier Directly-Powered From a DC-DC Power Converter," IEEE Microwave and Wireless Components Letters, vol. 22, No. 1, Jan. 2012, 3 pages.

* cited by examiner

*Primary Examiner* — Harry Behm
(74) *Attorney, Agent, or Firm* — Michael A. Davis, Jr.; Charles A. Brill; Frank D. Cimino

(57) ABSTRACT

Methods and apparatus for providing adaptive electromagnetic interference control in a power converter are disclosed. An example apparatus includes a current interface to measure an internal current of the power converter. The example apparatus further includes a performance determiner to determine a spur power of an output voltage of the power converter based on the measured internal current. The example apparatus further includes a ramp generator to adjust a hopping configuration of a ramp voltage based on the spur power.

12 Claims, 5 Drawing Sheets

US 10,044,257 B1

METHODS AND APPARATUS TO PROVIDE ADAPTIVE ELECTROMAGNETIC INTERFERENCE CONTROL IN A POWER CONVERTER

FIELD OF THE DISCLOSURE

This disclosure relates generally to power converters and, more particularly, to methods and apparatus for providing adaptive electromagnetic interference control in a power converter.

BACKGROUND

A power converter is a circuit that is used in various devices to convert an input voltage to a desired output voltage. Some power converters use a switching regulator to control the conversion of power in a highly efficient manner. However, the switching operation generates harmonic tones that may leak into the input and/or output of such power converters, thereby causing electromagnetic interference in the output of such power converters. Frequency hopping may be used to reduce the effects of electromagnetic interference. Frequency hopping includes switching a regulator (e.g., on or off) at various frequencies to spread the electromagnetic interference over a wider frequency band to reduce the effects on any particular frequency band. The frequencies used to frequency hop, number of frequencies used to frequency hop, the order of frequencies used, etc. effect the spread of the electromagnetic interference and the efficiency of the power converter.

SUMMARY

Examples disclosed herein provide adaptive electromagnetic interference control in a power converter. An example power converter includes a current interface to measure an internal current of the power converter. The example apparatus further includes a performance determiner to determine a spur power of an output voltage of the power converter based on the measured internal current. The example apparatus further includes a ramp generator to adjust a hopping configuration of a ramp voltage based on the spur power.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
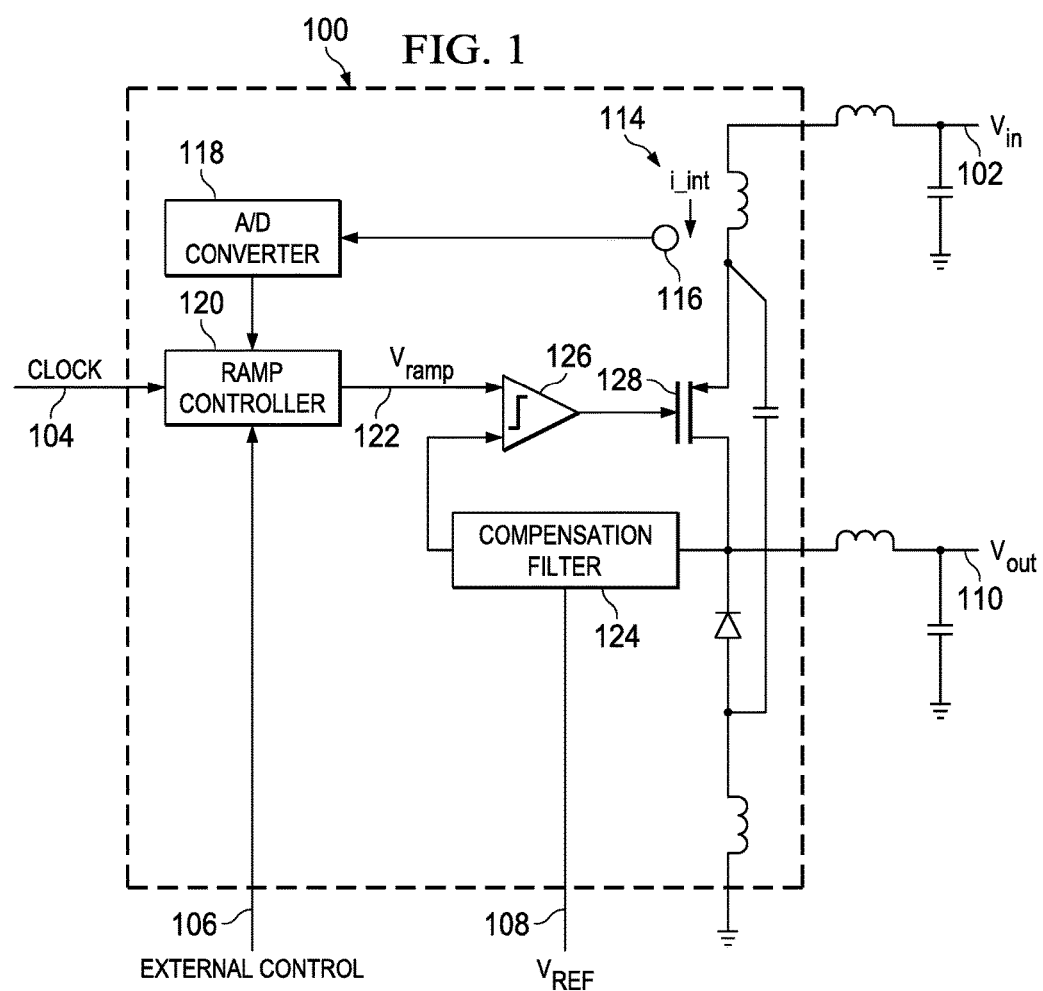
FIG. 1 is an illustration of an example power converter to provide adaptive electromagnetic interference control.

Switch mode power converters are highly efficient power converters that convert an input voltage to an output voltage by enabling and disabling (e.g., cycling) a transistor(s) at one or more frequencies to output a desired output voltage. The efficiency of a power converter (e.g., power converter efficiency) depends on the amount of time that the transistor is enabled (e.g., corresponding to a duty cycle). Although switch mode power converters are efficient, switching a transistor(s) from enable to disable and vice versa generates unwanted electromagnetic interference (EMI) in the form of spurs (i.e., spurious radio frequency emissions at fundamental and/or harmonic tones) at various bands of the output spectrum. Such spurs degrade the output of the power converter.

Hopping (e.g., frequency hopping and/or phase hopping) may be used to minimize the effect of the spurs generated in switch mode power converters. Frequency and/or phase hopping reduces spur power (e.g., corresponding to the harmonic peak of a tone at a frequency with the highest energy of the output frequency spectrum) by spreading the spur power throughout the output spectrum, thereby reducing the effects of EMI. As used herein, a harmonic peak represents an energy level of a fundamental tone or a harmonic tone at a frequency of a frequency spectrum caused by EMI. As used herein, spur power corresponds to the highest peak energy of a signal across the frequency spectrum of the signal. Although frequency and/or phase hopping reduces spur power, frequency and/or phase hopping increases the average switching loss, thereby decreasing the efficiency of the power converter. Frequency and/or phase hopping includes adjusting (e.g., switching or hopping) the switching frequency and/or phase of the power converter to two or more frequency and/or phases. For example, frequency and/or hopping may include switching the transistor(s) (e.g., on and off) between at a first frequency (1.1 Megahertz (MHz)) for a first duration of time, a second frequency (1.0 MHz) for a second duration of time, and a third frequency (0.9 MHz) for a third duration of time. Alternatively, any combination of phases (e.g., offsets) used, number of phases, frequencies used, number of frequencies used, order of phases, order of frequencies, and/or durations of time may be used for frequency and/or phase hopping. Each combination of phases (e.g., offsets) used, number of phases, frequencies used, number of frequencies used, order of phases, order of frequencies, and/or durations of time correspond to a different hopping configuration (e.g., frequency hopping and/or phase hopping). Each configuration corresponds to different effects on the efficiency and spur power associated with the power converter. For example, a three-phase frequency hopping cycle may be less efficient than a two-phase frequency hopping cycle. However, the three-phase frequency hopping cycle may correspond to a smaller spur power than the two-phase frequency hopping cycle. Examples disclosed herein utilize internal power converter current to identify spur power and adaptively adjust a frequency hopping mechanism based on the internal current to reduce spur power while maintaining desired efficiency.

Conventional techniques for reducing spur power while maintaining desired efficiency include measuring EMI at the output of the power converter during the design phase of a circuit including the power converter. Such conventional techniques program a frequency hopping configuration based on the initial testing. However, EMI may change with changes in the environment. For example, EMI may change due to component age, load changes, temperature changes, etc. Such conventional techniques do not adjust the frequency hopping configuration based on such changes. Such conventional techniques require re-testing and reprogramming the power converter based on the additional test. Examples disclosed herein alleviate the problems of conventional techniques by monitoring internal current corresponding to EMI spurs. Using examples disclosed herein, power converters can adaptively adjust frequency and/or phase hopping configurations in real-time to utilize the optimal configuration regardless of environmental changes.

Examples disclosed herein provide a switching power converter with a current sense to measure internal current of the power converter. Examples disclosed herein identify spur power related to the EMI based on the internal current. When the spur power is too high (e.g., above an acceptable spur power threshold), examples disclosed herein operate the power converter using various frequency and/or phase configurations to identify a configuration that, when applied, satisfies the acceptable spur power threshold. In some examples, because the frequency and/or phase configuration affects the efficiency of the power converter, examples disclosed herein select a configuration that satisfies some efficiency standard (e.g., a minimum efficiency threshold). In this manner, examples disclosed herein adjust the frequency and/or phase configurations to reduce spur power and while maintaining a desired efficiency.

The illustration of FIG. 1 illustrates an example power converter 100 providing adaptive EMI control. The example power converter 100 receives an example input voltage 102, an example signal (clock) 104, an example external control 106, an example reference voltage (Vref) 108, and outputs an example output voltage (Vout) 110. The example power converter 100 includes an example internal current 114, an example current interface 116, an example analog to digital (A/D) converter 118, an example ramp controller 120, an example ramp voltage (Vramp) 122, an example compensation filter 124, an example comparator 126, and an example transistor 128.

The example power converter 100 of FIG. 1 is an integrated circuit (IC) chip to convert the example Vin 102 to the example Vout 110 using a frequency and/or phase switching (e.g., hopping) technique. Alternatively, the example power converter 100 may be any kind of circuit. The example power converter may be a DC/DC converter (e.g., a buck converter or boost converter), an AC/DC converter, an AC/AC converter, and/or any other type of converter. Accordingly, the example Vin 102 and/or the example Vout 110 may be an alternating current (AC) voltage or a direct current (DC) voltage. In some examples, the example Vin 102 corresponds to an input device coupled to the input of the example power converter 100. In such examples, EMI tones may couple to the input device conductively via transmission lines, IC chip/board substrates and/or inductors. The input device corresponds with an input inductance and capacitance. Additionally, the example Vout 110 may correspond with an output device coupled to the output of the example power converter 100. EMI tones may couple to the output device conductively via transmission lines, IC chip/board substrates and/or inductors. The output device corresponds with an output inductance and capacitance.

As the example power converter 100 of FIG. 1 generates the example Vout 110, the example internal current 114 flows toward the drain of the example transistor 128. As described above, the internal current 114 of the power converter 100 can be processed to identify spur power (e.g., the highest fundamental and/or harmonic tones) in the output spectrum of the example Vout 110. Accordingly, the example current interface 116 senses the internal current 114 for further processing. In this manner, if environmental conditions (e.g., load, temperature, age) cause changes in spur power, such changes can be immediately detected by the example current interface 116. The example current interface 116 may be a sensor and/or any other device capable of determining the drain current. Alternatively, the example current interface 116 may sense the source current to identify spur power.

The example A/D converter 118 of FIG. 1 receives the sensed internal current 114 (e.g., the drain current) from the example current interface 116. The example A/D converter 118 converts the analog sensed current of the example current interface 116 into a digital value for further processing by the example ramp controller 120. In some examples, the A/D converter 118 may be replaced with any other device capable of converting an analog value into a digital value (e.g., an analog threshold, for example). The example A/D converter 118 transmits the digital current value to the example ramp controller 120.

The example ramp controller 120 of FIG. 1 generates the example Vramp 122 based on a frequency and/or phase configuration to reduce spur power and increase efficiency. The example ramp controller 120 receives the digital current value from the example A/D converter 118, the example clock 104, and the example external control 106. The example ramp controller 120 processes the example digital current value to identify spur power corresponding to the example Vout 110. Based on the identified spur power, the example ramp controller 120 determines if the example Vramp 122 should be adjusted by changing the phase and/or frequency hopping configuration to A) reduce the spur power and/or B) increase efficiency of the power converter 100. In some examples, the ramp controller 120 is capable of operating using a plurality of frequency and/or phase configurations based on the example clock 104. For example, if the clock is pulsing at 10 MHz, the example ramp controller 120 may be able to generate 1 MHz ramp by cycling a ramp up of 10 pulses. Additionally, the example ramp controller 120 may be capable of generating a 0.9 MHz ramp, and a 1.1 MHz ramp. In such an example, a first frequency and/or phase configuration may include operating the Vramp 122 at 1.0 MHz for 5 milliseconds, followed by 0.9 MHz for 5 milliseconds, followed by 1.1 MHz for 5 milliseconds, and repeating. A second frequency and/or phase configuration may include operating the Vramp 122 at 1.1 MHz for 10 milliseconds followed by 0.9 MHz for 5 milliseconds and repeating. Additionally, the ramp controller 120 may be capable of operating using any combination of frequency, number of phases, time, and/or order of phases. The example ramp controller 120 may store the possible configurations locally. In this manner, when the internal current 114 corresponds to a spur power above a threshold, the example ramp controller 120 can operate under a different frequency and/or phase configuration to lower the spur power. Each configuration corresponds to a different spur power and/or efficiency. Accordingly, when the spur power increases above the threshold, the ramp controller 120 can test each configuration to decrease in spur power while maintaining a desired efficiency. Additionally, the example ramp controller 120 may receive the example external control 106. The example external control 106 is a signal that may include instructions to override the dynamic frequency and/or phase configuration based on user and/or manufacture preferences. The example ramp controller 120 is further described below in conjunction with FIG. 2.

The example compensation filter 124 of FIG. 1 filters the example Vout 110 based on the example Vref 108 to generate a feedback voltage. The feedback voltage ensures that the example Vout 110 is output at the correct voltage level. In the illustrated example of FIG. 1, the desired voltage level is the example Vref 108. For example, if the example Vout 110 is higher or lower than the example Vref 108, the example compensation filter 124 adjusts the feedback loop to ensure that the signal applied to the gate of the example transistor 128 (e.g., the output of the example comparator 126) will correspond to the example Vref 108. In other words, the feedback voltage provides an error correction for any error in the example Vout 110. The feedback voltage provides and error correction for any error in the example Vout 110. The example compensation filter 124 outputs the feedback voltage to the example comparator 126.

The example comparator 126 of FIG. 1 compares the example Vramp 122 output by the example ramp controller 120 to the feedback voltage output by the example compensation filter 124. When the example Vramp 122 is larger than the feedback voltage, the example comparator 126 outputs a high voltage (e.g., 3 V) and, when the example Vramp 122 is smaller than the example feedback voltage, the example comparator 126 outputs a low voltage (e.g., 0V). In the illustrated example of FIG. 1, the Vramp 122 will be larger than the feedback voltage for a first portion of time and will be smaller than the feedback voltage for a second portion of time depending on the frequency and/or phase configuration controlling the example Vramp 122. The output of the example comparator 126 is used to control (e.g., enable or disable) the example transistor 128. Accordingly, the output of the example comparator 126 will be a pulse wave, thereby enabling the example transistor to increase the example Vout 110 (e.g., using the example Vin 102) for the first duration of time and decrease Vout 110 for the second duration of time. The enabling and/or disabling of the example transistor 128 creates a substantially stable Vout 110.

Figure 2:
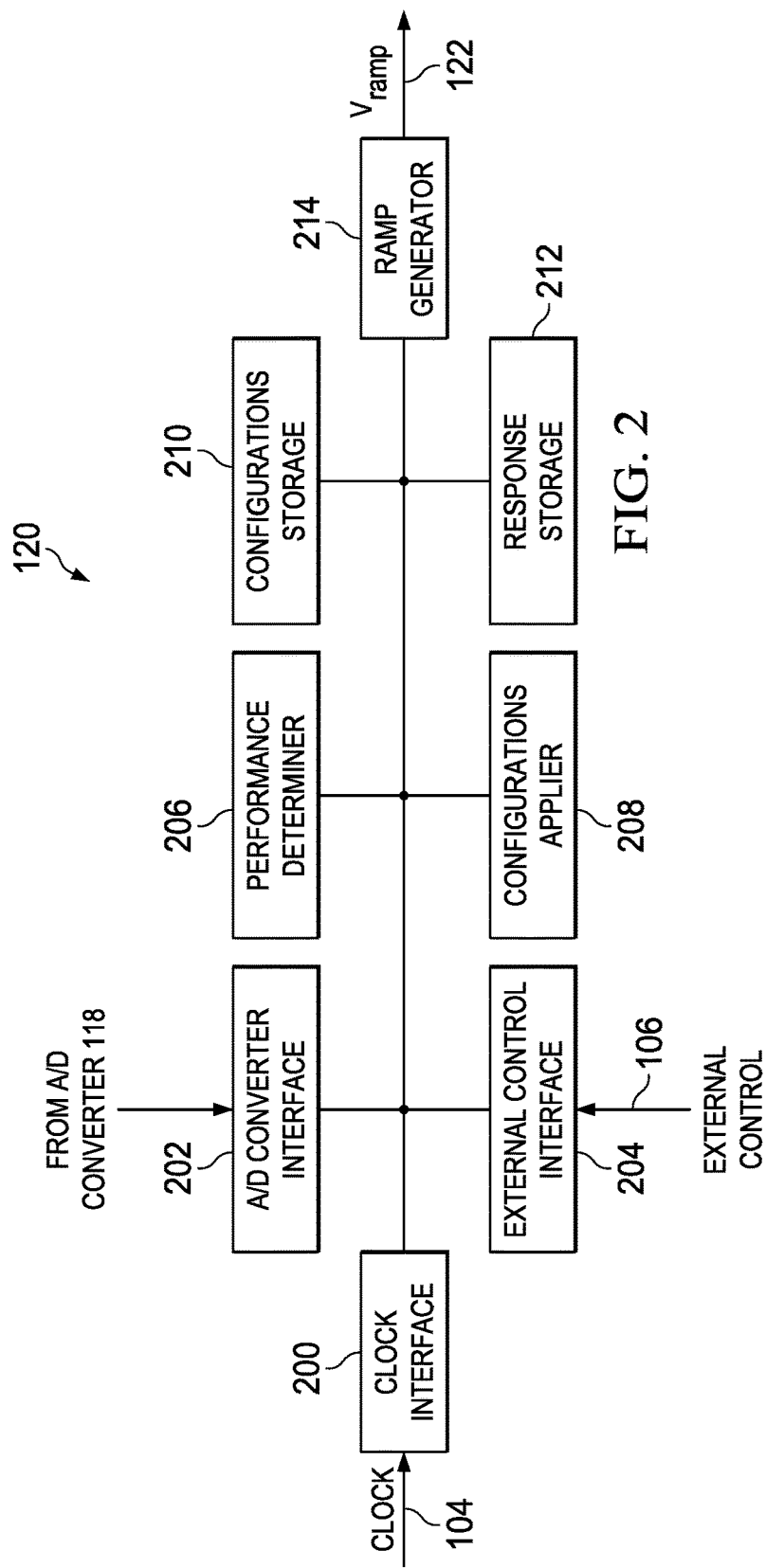
FIG. 2 is a block diagram of an example ramp controller of FIG. 1.

FIG. 2 is a block diagram of an example implementation of the example ramp controller 120 of FIG. 1, disclosed herein, to provide adaptive EMI control in the example power converter 100 of FIG. 1 by changing frequency and/or phase configurations based on a sensed internal current. While the example ramp controller 120 is described in conjunction with the example power converter 100 of FIG. 1, the example ramp controller 120 may be utilized provide adaptive EMI control in any type of power converter. The example ramp controller 120 includes an example clock interface 200, an example (A/D) converter interface 202, an example external control interface 204, an example performance determiner 206, an example configurations applier 208, an example configurations storage 210, an example response storage 212, and an example ramp generator 214.

The example clock interface 200 of FIG. 2 receives the example clock signal 104 of FIG. 1. As described above, the example clock signal 104 is a series of pulse that can be counted and/or used as a trigger. In this manner, the clock interface 200 receives the clock signal 104 to provide a time reference for the example ramp controller 120. For example, the ramp generator 214 may generate a ramp at a first frequency based on a first number of clock pulses of the clock signal 104. When the ramp generator 214 changes the ramp to correspond to a second frequency, the ramp generator 214 may generate the ramp based on a second number of clock pulses of the clock signal 104. The example A/D converter interface 202 receives a digital value from the example A/D converter 118 of FIG. 1. The digital value represents the frequency spectrum of the example internal current 114 of FIG. 1, used to identify spur power. The example external control interface 204 receives the example external control 106 of FIG. 1. As described above in conjunction with FIG. 1, the example external control 106 provides an input to override frequency and/or phase hopping configurations set by the example configurations applier 208. An external user interface, an external controller, and/or any other external device may generate the external control 106. Alternatively, the example clock interface 200, the example A/D converter interface 202, and/or the example external control interface 204 may be combined and/or expanded into any number of interfaces.

The example performance determiner 206 of FIG. 2 determines the amount of interference and/or spur power at the example Vout 110 based on the digital value representative of the example internal current 114 received by the example A/D converter interface 202. The example performance determiner 206 determines the spur power caused by the EMI by identifying harmonic peaks in the frequency spectrum of the example internal current 114. For example, higher peak energies correspond to a higher EMI effect and/or spur power. Additionally, the example performance determiner 206 identifies the efficiency of the power converter 100 of FIG. 1. As described above, the efficiency of the converter relates to the frequency and/or phase hopping configurations. In some examples, the performance determiner 206 uses the digital value of the example internal current 114 to determine the efficiency of the example power converter 100. For example, the performance determiner 206 may compare the internal current 114 to an expected or actual output current to identify the efficiency. In some examples, the performance determiner 206 determines the efficiency of the example power converter 100 based on an observed change of the example internal current 114. In some examples, the performance determiner 206 determines the interference periodically and/or aperiodically to identify when the frequency and/or phase hopping configuration should be adjusted. As described above, the frequency and/or phase hopping configurations may need to be adjusted based on a change in load, temperature, age, etc.

The example configurations applier 208 of FIG. 2 gathers frequency and/or phase hopping configurations stored in the example configurations storage 210 and instructions the example ramp generator 214 to apply (e.g., output) and/or adjust the example Vramp 122 based on one or more of the example configurations. The example configurations applier 208 determines whether the spur power and/or efficiency of the power converter 100 is too high and/or low and adjusts the frequency and/or phase hopping output of the ramp generator 214 (e.g., Vramp 122) accordingly. For example, if output of the example Vramp 122 corresponds to the example internal current 114 being too noisy (e.g., one or more harmonic peaks are above a maximum interference threshold), the example configurations applier 208 may adjust the frequency and/or phase hopping configurations to spread the interference across the output spectrum, thereby reducing the spur power. In some examples, the configurations applier 208 runs a diagnostic test to determine which frequency and/or phase hopping configuration to utilize based on the example internal current 114. In such examples, the configurations applier 208 may apply all of the frequency and/or phase hopping configurations stored in the example configuration storage 210 for one or more cycles. While testing, the example performance determiner 206 determines the performance (e.g., interference and efficiency) of each frequency and/or phase hopping configuration stored in the example configuration storage 210 and the example configurations applier 208 stores the testing results (e.g., the responses) in the example response storage 212. In this manner, the configuration applier 208 selects the most appropriate frequency and/or phase hopping configuration to satisfy any efficiency and/or interference parameters based on the results stored in the example response storage 212.

The example configurations storage 210 and the example response storage 212 of FIG. 2 are storage devices and/or memory such as such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). The example configurations storage 210 stores all possible frequency and/or phase hopping configurations that may be applied by the example ramp generator 214 to generate the example Vramp 122. The stored frequency and/or phase hopping configurations may be automatically generated based on the limitations of the example power converter 100 and/or may be generated by a user and/or manufacturer. The example hopping configurations stored in the example configurations storage 210 may be updated at any time by a user and/or manufacturer using an interface (e.g., the example external control interface 204 and/or any other additional interface). The example response storage 212 stores the testing results of the diagnostic tests run by the example configurations applier 208.

The example ramp generator 214 of FIG. 2 outputs the example Vramp 122 based on frequency and/or phase hopping configurations selected by the configuration applier. For example, during a testing phase, the ramp generator 214 outputs the example Vramp 122 based on some or all of the frequency and/or phase hopping configurations stored in the example configurations storage 210. After the example configuration applier 208 selects the frequency and/or phase hopping configuration, the example ramp generator 214 adjusts the example Vramp 122 based on the selected frequency and/or phase hopping configuration. In some examples, the ramp generator 214 is a digital ramp generator capable of generating a digital ramp signal. In some examples, the ramp generator 214 is a hardware-based generator capable of generating a ramp signal utilizing electrical components, such as switches, transistors, capacitors, etc.

While example manners of implementing the example ramp controller 120 of FIG. 1 is illustrated in FIG. 2, elements, processes and/or devices illustrated in FIG. 2 may be combined, divided, re-arranged, omitted, eliminated and/or implemented in any other way. Further, the example clock interface 200, the example A/D converter interface 202, the example external control interface 204, the example performance determiner 206, the example configurations applier 208, the example configuration storage 210, the example response storage 212, the example ramp generator 214, and/or, more generally, the example ramp controller 120 of FIGS. 1 and 2, may be implemented by hardware, machine readable instructions, software, firmware and/or any combination of hardware, machine readable instructions, software and/or firmware. Thus, for example, any of the example clock interface 200, the example A/D converter interface 202, the example external control interface 204, the example performance determiner 206, the example configurations applier 208, the example configuration storage 210, the example response storage 212, the example ramp generator 214, and/or, more generally, the example ramp controller 120 of FIGS. 1 and 2 could be implemented by analog and/or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example clock interface 200, the example A/D converter interface 202, the example external control interface 204, the example performance determiner 206, the example configurations applier 208, the example configuration storage 210, the example response storage 212, the example ramp generator 214, and/or, more generally, the example ramp controller 120 of FIGS. 1 and 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example ramp controller 120 of FIGS. 1 and 2 includes elements, processes and/or devices in addition to, or instead of, those illustrated in FIGS. 3-5, and/or may include more than one of any or all of the illustrated elements, processes and devices.

Figures 3, 4:
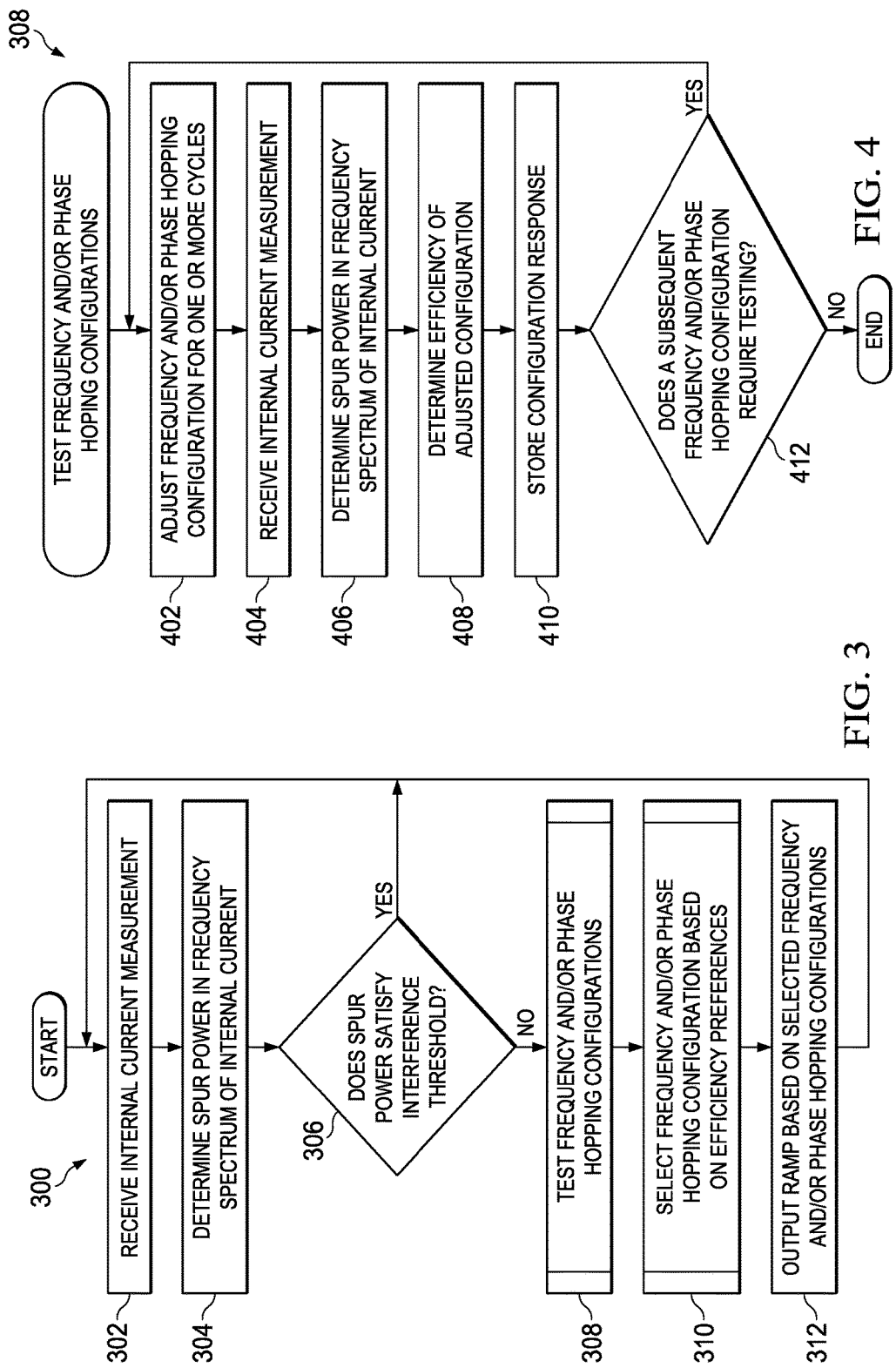
FIG. 3 is a flowchart representative of example machine readable instructions that may be executed to implement the example ramp controller of FIGS. 1 and 2 to output an example ramp voltage of FIGS. 1 and 2.
FIG. 4 is a flowchart representative of example machine readable instructions that may be executed to implement the example ramp controller of FIGS. 1 and 2 to test frequency and/or phase hopping configurations.
Figure 5:
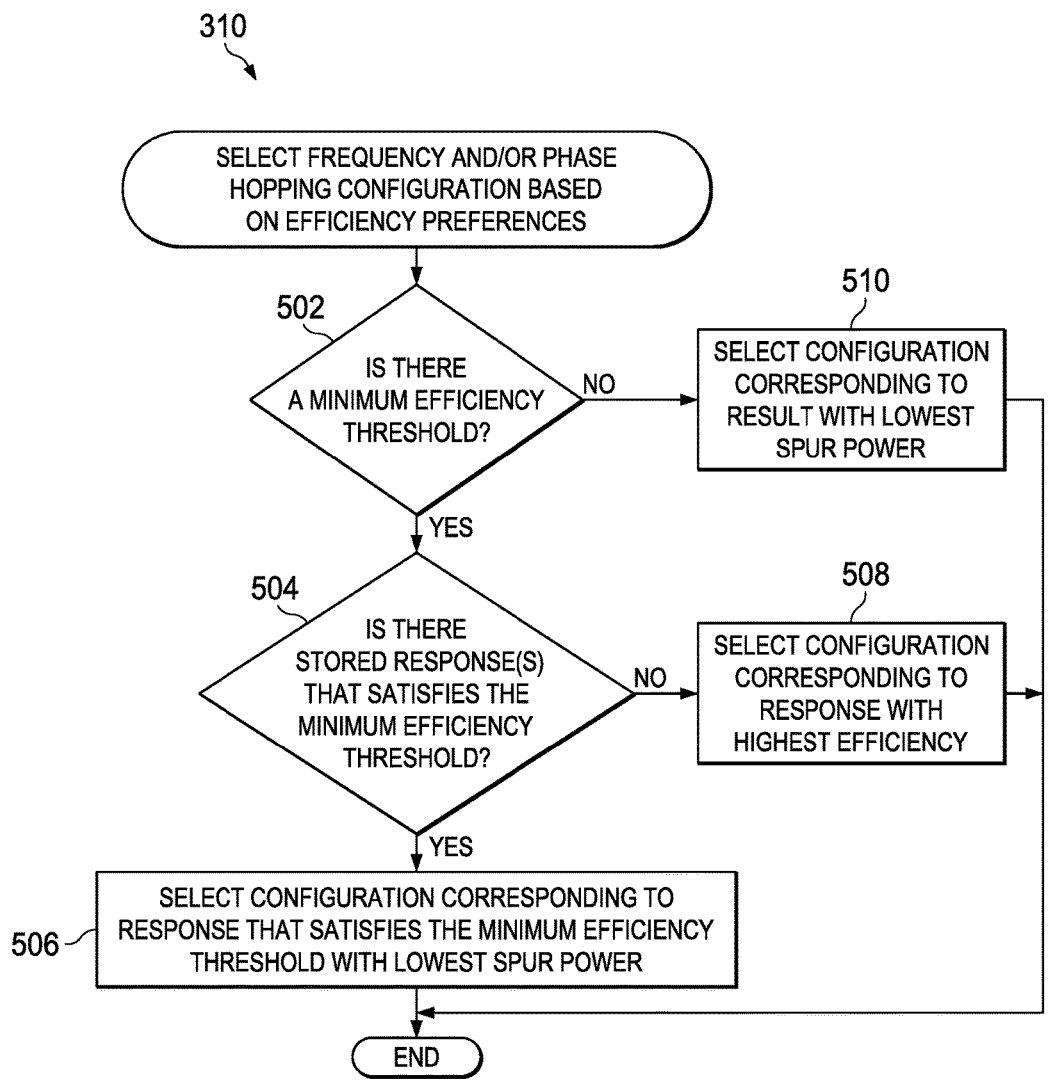
FIG. 5 is a flowchart representative of example machine readable instructions that may be executed to implement the example ramp controller of FIGS. 1 and 2 to select a frequency and/or phase hopping configuration based on efficiency preferences.

A flowchart representative of example machine readable instructions for implementing the example ramp controller 120 of FIGS. 1 and 2 are shown in FIGS. 3-5. In the examples, the machine readable instructions comprise a program for execution by a processor such as the processor 612 shown in the example processor platform 600 discussed below in connection with FIG. 6. The program may be embodied in machine readable instructions stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIGS. 3-5, many other methods of implementing the example ramp controller 120 of FIGS. 1 and 2 may alternatively be used. For example, the order of execution of the blocks may be changed, and/or some of the blocks described may be changed, eliminated, or combined.

As mentioned above, the example process of FIGS. 3-5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIGS. 3-5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 3 is an example flowchart 300 representative of example machine readable instructions that may be executed by the example ramp controller 120 of FIGS. 1 and 2 to provide adaptive EMI control in the example power converter 100 of FIG. 1. Although the instructions of FIG. 3 are described in conjunction with the example ramp controller 120 of FIGS. 1 and 2, the example instructions may be utilized by any type of controller in any type of power converter.

At block 302, the example A/D converter interface 202 receives an internal current measurement from the example A/D converter 118 of FIG. 1. As described above in conjunction with FIGS. 1 and 2, the internal current measurement is a digital value corresponding to the example internal current 114 of FIG. 1. The internal current 114 is sampled via the example current interface 116 and converted into a digital value by the example A/D converter 118. The internal current 114 includes EMI within the frequency spectrum of internal current 114. The effect of the EMI (e.g., spur power) is based on power of the harmonic peaks (e.g., the fundamental and/or harmonic tones) in the frequency spectrum. For example, if the EMI is evenly spread across all frequency domains in a spectrum, the harmonic peaks in each domain will be relatively small (e.g., the spur power will be small), thereby reducing the effect of the EMI. If the EMI is not evenly spread, there may be a frequency domain with a large harmonic peak corresponding to a large spur power, thereby increasing the effect of the EMI. At block 304, the example performance determiner 206 determines the spur power (e.g., the energy corresponding to the largest peak in the frequency spectrum) of the example internal current 114.

At block 306, the example configurations applier 208 determines if the spur power satisfies an interference threshold (e.g., a maximum interference threshold). For example, as described above, if the spur power is low (e.g., below the interference threshold), the effect of the EMI is low. In such an example, it may not be desirable to reduce the effect of EMI, because doing so would also reduce efficiency. However, if the spur power is high (e.g., above the interference threshold), the effect of EMI is high. Accordingly, it may be desirable to reduce the effect of EMI to reduce the EMI effect. The interference threshold may be adjusted based on user and/or manufacture preferences.

If the example configurations applier 208 determines that the spur power satisfies the interference threshold (e.g., all of the harmonic peaks are below the interference threshold) (block 306: YES), the process returns to block 302 until the example internal current 114 corresponds to a spur power that do not satisfy (e.g., is above) the interference threshold. If the example configurations applier 208 determines that the spur power does not satisfy the interference threshold (e.g., one or more of the harmonic peaks are above the interference threshold) (block 306: NO), the example configurations applier 208 tests frequency and/or phase hopping configurations stored in the example configurations storage 210 (block 308). The example configurations applier 208 tests the frequency and/or phase hopping configurations to determine a configuration that, when applied by the ramp generator 214, satisfies the interference threshold, as described below in conjunction with FIG. 4.

At block 310, the example configurations applier 208 selects a frequency and/or phase hopping configuration based on efficiency preferences. The efficiency preferences correspond to the efficiency of the example power converter 100 when generating the example Vout 110. The efficiency preferences are based on a minimum efficiency of the power converter 100 and may be adjusted based on user and/or manufacturer preferences. The selection of the frequency and/or phase hopping configuration is further described below in conjunction with FIG. 5. At block 312, the example ramp generator 214 outputs the example Vramp 122 based on the selected frequency and/or phase hopping configurations. As explained above in conjunction with FIG. 2, the ramp generator 214 outputs the Vramp 122 at the selected frequency based on the example clock signal 104. As described above in conjunction with FIG. 2, the example ramp generator 214 may adjust the Vramp 122 at any time based on the example external control 106 received by the example external control interface 204.

FIG. 4 is an example flowchart 308 representative of example machine readable instructions that may be executed by the example ramp controller 120 of FIGS. 1 and 2 to test frequency and/or phase hopping configurations as described above in conjunction with block 308 of FIG. 3. Although the instructions of FIG. 4 are described in conjunction with the example ramp controller 120 of FIGS. 1 and 2, the example instructions may be utilized by any type of controller in any type of power converter.

At block 402, the example configurations applier 208 adjusts the frequency and/or phase hopping configuration for one or more cycles. The example configurations applier 208 identifies available frequency and/or phase hopping configurations based on the frequency and/or phase hopping configurations stored in the example configurations storage 210. In some examples, the configurations storage 210 store a hierarchy of configurations. As described above in conjunction with FIG. 2, the example configurations applier 208 applies each of the frequency and/or phase configurations stored in the example configuration storage 210 for one or more cycles to identify the optimal frequency and/or phase hopping configuration based on a desired spur power and/or efficiency. The example configurations applier 208 adjusts the frequency and/or phase hopping configurations by selecting a first hopping configuration of the configurations and instructing the ramp generator 214 to output the example Vramp 122 based on the selected frequency and/or phase hopping configurations. In this manner, each stored frequency and/or phase hopping configuration can be tested to identify the optimal configuration.

At block 404, the example A/D converter interface 202 receives an internal current measurement from the example A/D converter 118 representative of the example internal current 114 based on the adjusted frequency and/or phase hopping configuration. In this manner, the internal current 114 response can be identified for each frequency and/or phase configuration during testing. At block 406, the example performance determiner 206 determines the spur power (e.g., the highest harmonic peak in the frequency spectrum) of the example internal current 114 due to EMI. At block 408, the example performance determiner 206 determines the efficiency of the adjusted frequency and/or phase hopping configuration. As described above in conjunction with FIG. 2, the example performance determiner 206 determines the efficiency of the power converter 100 comparing the internal current 114 to an expected or actual output current and/or observing the change of the example internal current 114.

At block 410, the example configurations applier 208 stores the frequency and/or phase hopping configuration response in the example response storage 212. The frequency and/or phase hopping configuration response includes the data related to the example internal current 114 (e.g., the harmonic peak energies, the spur power, the total EMI, the efficiency of the power converter 100, an identifier of the configuration, etc.) measured while testing the frequency and/or phase hopping configuration. For example, the configuration applier 208 may store a configuration response for a first frequency and/or phase hopping configuration including an identifier for the first hopping configuration, the digital value of the internal current when applying the first hopping configuration, the peak energies of the internal current, the spur power of the internal current, the efficiency of the power convert while apply the first hopping configuration, etc. In this manner, the example configurations applier 208 can select an optimal frequency and/or phase hopping configuration by comparing the configuration responses of all the available frequency and/or phase configurations.

At block 412, the example configurations applier 208 determines if a subsequent frequency and/or phase hopping configuration requires testing. For example, if the configuration storage 210 includes five difference frequency and/or phase hopping configurations, the process continues to test the remaining (e.g., subsequent) frequency and/or phase hopping configurations until all stored configurations have been tested. Alternatively, the example configurations applier 208 may test each configuration until a frequency and/or phase hopping configuration is selected that satisfies the interference threshold. In this manner, the example configuration applier 208 selects the configuration that satisfies the interference threshold without continuing to test remaining (e.g., untested) frequency and/or phase hopping configurations. In such an example, the configurations applier 208 may also verify that the efficiency of the selected configuration satisfies any efficiency requirements before selecting the configuration for operation.

If the example configurations applier 208 determines that a subsequent frequency and/or phase hopping configuration requires testing (block 412: YES), the process returns to block 402 to test the subsequent frequency and/or phase hopping configuration. If the example configurations applier 208 determines that a subsequent frequency and/or phase hopping configuration does not require testing (block 412: NO), the process ends.

FIG. 5 is an example flowchart 310 representative of example machine readable instructions that may be executed by the example ramp controller 120 of FIGS. 1 and 2 to select a frequency and/or phase hopping configuration based on efficiency preferences, as described above in conjunction with block 310 of FIG. 3. Although the instructions of FIG. 5 are described in conjunction with the example ramp controller 120 of FIGS. 1 and 2, the example instructions may be utilized by any type of controller in any type of power converter.

At block 502, the example configurations applier 208 determines if there is a minimum efficiency threshold. Some power converters may be designed to operate under a minimum efficiency threshold. Accordingly, such power converters may be limited to frequency and/or phase hopping configurations that satisfy the minimum efficiency threshold. If the configurations applier 208 determines that there is not a minimum efficiency threshold (block 502: NO), the example configurations applier 208 selects the frequency and/or phase hopping configuration corresponding to the result stored in the example response storage 212 with the lowest spur power (block 510). In this manner, the effect of EMI is reduced to the minimum amount based on the available frequency and/or phase hopping configurations. The minimum efficiency threshold may be adjusted based on user and/or manufacturer preferences. Alternatively, the example configurations applier 208 may select the frequency and/or phase hopping configuration that is closest to a target value or range. For example, a user and/or manufacturer may select a target spur power value or range. This target spur power may correspond to the maximum amount of spur power that does not significantly impact the example Vout 110. In this manner, the example configurations applier 208 may select the frequency and/or phase hopping configuration that is closest to the target spur power to maximize efficiency while ensuring that the example Vout 110 is not significantly effected.

If the example configurations applier 208 determines that there is a minimum efficiency threshold (block 502: YES), the example configurations applier 208 determines if there is a stored response(s) that satisfies the minimum efficiency threshold (block 504). As described above, during the configuration testing phase of flowchart 308 (FIG. 4), the configuration response for each frequency and/or phase hopping configuration is stored in the example response storage 212. Accordingly, the example configurations applier 208 analyzes the stored responses to identify if there is a stored response(s) that satisfies the minimum efficiency threshold.

If the example configurations applier 208 determines that there is a stored response(s) that satisfies the minimum efficiency threshold (block 504: YES), the example configurations applier 208 selects the frequency and/or phase hopping configuration corresponding to the response with the lowest spur power that also satisfies the minimum efficiency threshold (block 506). For example, if the minimum efficiency threshold is 80% efficient and two frequency and/or phase hopping configurations are above the minimum efficiency threshold (e.g., a first hopping configuration that is 85% efficient and a second hopping configuration that is 90% efficient), then the configurations applier 208 selects the minimum threshold satisfying configuration with the lowest spur power. For example, if the first hopping configuration corresponds to a spur power of 20 decibels (dB) and the second hopping configuration corresponds to a spur power of 25 dB, the example configurations applier 208 selects the first hopping configuration.

If the example configurations applier 208 determines that there is not a stored response(s) that satisfies the minimum efficiency threshold (block 504: NO), the example configurations applier 208 selects the frequency and/or phase hopping configuration corresponding to the response with the highest efficiency (block 508). In this manner, if none of the stored frequency and/or phase hopping configurations in the example configuration storage 210 satisfy the minimum efficiency threshold, the example configurations applier 208 selects the hopping configuration with the highest efficiency to get as close to the minimum efficiency threshold as possible.

Figure 6:
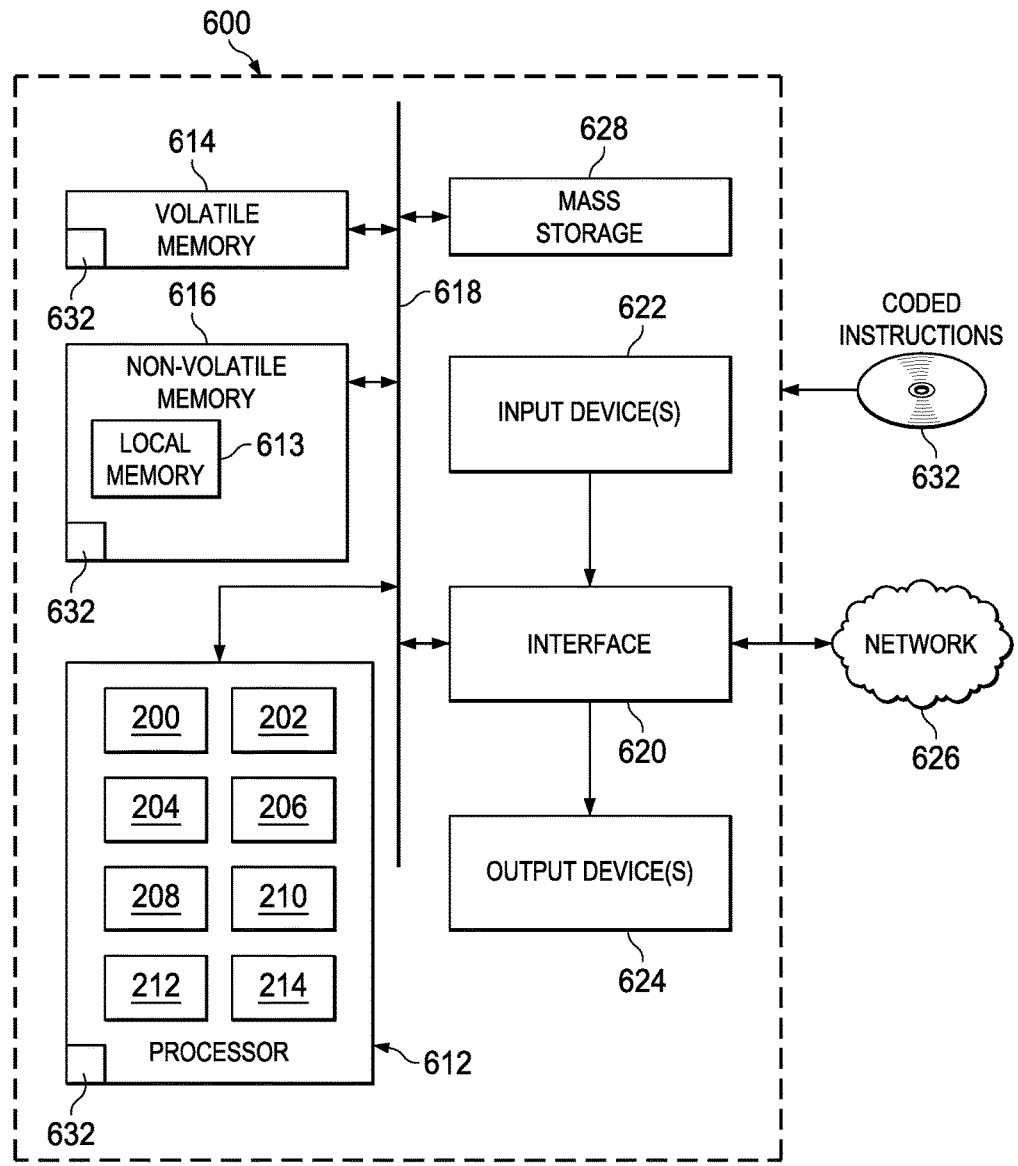
FIG. 6 is a block diagram of a processor platform structured to execute the example machine readable instructions of FIGS. 3-5 to control the example ramp controller of FIGS. 1-2.

FIG. 6 is a block diagram of an example processor platform 600 capable of executing the instructions of FIGS. 7-10 to implement the example ramp controller 120 of FIGS. 1 and/or 2. The processor platform 600 can be, for example, a server, a personal computer, a mobile device (e.g., a cell phone, a smart phone, a tablet such as an iPad™), a personal digital assistant (PDA), an Internet appliance, or any other type of computing device.

The processor platform 600 of the illustrated example includes a processor 612. The processor 612 of the illustrated example is hardware. For example, the processor 612 can be implemented by integrated circuits, logic circuits, microprocessors or controllers from any desired family or manufacturer.

The processor 612 of the illustrated example includes a local memory 613 (e.g., a cache). The example processor 612 of FIG. 6 executes the instructions of FIGS. 3-5 to implement the example clock interface 200, the example A/D converter interface 202, the example external control interface 204, the example performance determiner 206, the example configurations applier 208, the example configuration storage 210, the example response storage 212, and/or the example ramp generator 214 of FIG. 2 to implement the example ramp controller 120 of FIG. 1. The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a clock controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

The coded instructions 632 of FIGS. 3-5 may be stored in the mass storage device 628, in the volatile memory 614, in the non-volatile memory 616, and/or on a removable tangible computer readable storage medium such as a CD or DVD.

From the foregoing, it would be appreciated that the above disclosed method, apparatus, and articles of manufacture provide adaptive electromagnetic interference control in a power converter. Examples disclosed herein adjust the frequency and/or phase configurations of the power converter to reduce spur power while maintaining efficiency preferences based on an internal current of the power converter. In this manner, the power converter can adjust the frequency and/or phase configurations in real-time to adjust for changes in EMI due to changes in load, temperature, and time. Conventional techniques for reducing spur power while maintaining desired efficiency include measuring EMI at the output of the power converter during the design phase of a circuit including the power converter. Such conventional techniques program a frequency hopping configuration based on the initial testing. However, EMI may change with changes in the environment. Examples disclosed herein alleviate the problems associated with such conventional techniques by monitoring internal current for changes in spur power to quickly adapt to the changes while maintaining efficiency preferences.

Although certain example methods, apparatus and articles of manufacture have been described herein, other implementations are possible. The scope of coverage of this patent is not limited thereto. On the contrary, this patent covers all methods, apparatus and articles of manufacture fairly falling within the scope of the claims of this patent.

What is claimed is:

1. A power converter comprising:
    a current interface to measure an internal current of the power converter;
    a performance determiner to determine a spur power of an output voltage of the power converter based on the measured internal current;
    a ramp generator to adjust a hopping configuration of a ramp voltage based on the spur power; and
    a configurations applier to: test a plurality of possible hopping configurations, including by instructing the ramp generator to output the ramp voltage based on each tested hopping configuration and, in response to the outputting, receiving the spur power and a power converter efficiency corresponding to each tested hopping configuration; and from the tested hopping configurations, select the adjusted hopping configuration, based on satisfying an efficiency threshold.

2. The power converter of claim 1, wherein the spur power corresponds to a harmonic peak in a frequency spectrum of the internal current.

3. The power converter of claim 1, wherein the possible hopping configurations include at least one of a frequency hopping configuration or a phase hopping configuration.

4. The power converter of claim 1, wherein the performance determiner is to determine the spur power and the power converter efficiency corresponding to each tested hopping configuration, based on the internal current.

5. A method comprising:
measuring an internal current of a power converter;
determining a spur power of an output voltage of the power converter based on the measured internal current;
adjusting a hopping configuration of a ramp voltage based on the spur power;
testing a plurality of possible hopping configurations, including by outputting the ramp voltage based on each tested hopping configuration and, in response to the outputting, receiving the spur power and a power converter efficiency corresponding to each tested hopping configuration; and
from the tested hopping configurations, selecting the adjusted hopping configuration, based on satisfying an efficiency threshold.

6. The method of claim 5, wherein the spur power corresponds to a harmonic peak in a frequency spectrum of the internal current.

7. The method of claim 5, wherein the possible hopping configurations include at least one of a frequency hopping configuration or a phase hopping configuration.

8. The method of claim 5, further including determining the spur power and the power converter efficiency corresponding to each tested hopping configuration, based on the internal current.

9. A non-transitory computer readable storage medium comprising instructions which, when executed, cause a power converter to at least:
measure an internal current of the power converter;
determine a spur power of an output voltage of the power converter based on the measured internal current;
adjust a hopping configuration of a ramp voltage based on the spur power;
test a plurality of possible hopping configurations, including by outputting the ramp voltage based on each tested hopping configuration and, in response to the outputting, receiving the spur power and a power converter efficiency corresponding to each tested hopping configuration; and
from the tested hopping configurations, select the adjusted hopping configuration, based on satisfying an efficiency threshold.

10. The non-transitory computer readable storage medium of claim 9, wherein the spur power corresponds to a harmonic peak in a frequency spectrum of the internal current.

11. The non-transitory computer readable storage medium of claim 9, wherein the possible hopping configurations include at least one of a frequency hopping configuration or a phase hopping configuration.

12. The non-transitory computer readable storage medium of claim 9, wherein the instructions, when executed, cause the power converter to at least: determine the spur power and the power converter efficiency corresponding to each tested hopping configuration, based on the internal current.

* * * * *